(12) United States Patent
Walburger

(10) Patent No.: US 11,303,753 B2
(45) Date of Patent: Apr. 12, 2022

(54) ENHANCING AGENT'S EFFICIENCY IN A CONTACT CENTER BY USING A MULTI-AGENT TO MULTI-CONTACT ROUTING ORCHESTRATION

(71) Applicant: inContact INC., Sandy, UT (US)

(72) Inventor: Derick Rodney Walburger, South Jordan, UT (US)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 16/731,133

(22) Filed: Dec. 31, 2019

(65) Prior Publication Data

US 2021/0203785 A1    Jul. 1, 2021

(51) Int. Cl.
| | |
|---|---|
| H04M 3/00 | (2006.01) |
| H04M 5/00 | (2006.01) |
| H04M 3/523 | (2006.01) |
| G06Q 10/06 | (2012.01) |
| H04M 3/493 | (2006.01) |

(Continued)

(52) U.S. Cl.
CPC .... H04M 3/5233 (2013.01); G06Q 10/06393 (2013.01); H04M 3/4933 (2013.01); H04M 3/5175 (2013.01); H04M 3/5191 (2013.01); H04M 3/5237 (2013.01)

(58) Field of Classification Search
CPC ............. H04M 3/5233; H04M 3/5175; H04M 3/5232; H04M 3/5183; H04M 3/523; H04M 3/5191; H04M 3/5166; H04M 2203/402; H04M 2203/401; H04M 3/5235; H04M 3/5133; H04M 3/42068; H04M 2201/40; H04M 2201/42; H04M 2203/256; H04M 2201/38; H04M 2203/404; G06Q 30/016; G06Q 10/063112; G06Q 10/06393; G06Q 10/06315; G06Q 10/063114
USPC ............ 379/265.12, 265.13, 265.09, 265.03, 379/88.01, 265.05, 265.1, 265.11; 370/352

See application file for complete search history.

(56) References Cited

U.S. PATENT DOCUMENTS

| | | | |
|---|---|---|---|
| 6,424,709 B1 * | 7/2002 | Doyle | H04M 3/5233 379/265.02 |
| 8,073,129 B1 * | 12/2011 | Kalavar | H04M 3/5233 379/265.01 |
| 10,645,225 B1 * | 5/2020 | Stoops | G06T 3/0093 |

(Continued)

*Primary Examiner* — Kharye Pope
(74) *Attorney, Agent, or Firm* — Soroker Agmon Nordman

(57) ABSTRACT

A computerized method for enhancing agent's efficiency in a contact center by orchestrating a multi-agent to multi-contact attribute-based routing while maintaining seamless contact interaction is provided herein. The computerized method receives a request for service and in response may operate an orchestration engine. The orchestration engine derives contact related information from the communication channel to yield at least one contact attribute and according to a preconfigured set of rules and the agent's availability state, perform attribute-based routing of the request for service to one or more agents and designate a primary agent to handle the request for service and one or more agents as secondary agents. once an interaction between the one or more agents and the contact has commenced the computerized method sends information related to the handled request to the one or more designated secondary agents' and enable them to participate in the interaction via a display.

27 Claims, 5 Drawing Sheets

(51) Int. Cl.
    *H04M 3/51*        (2006.01)
    *H04L 12/66*      (2006.01)

(56) References Cited

U.S. PATENT DOCUMENTS

| | | | |
|---|---|---|---|
| 2005/0105712 A1* | 5/2005 | Williams | H04M 3/5166 379/265.02 |
| 2009/0327441 A1* | 12/2009 | Lee | H04M 3/5191 709/206 |
| 2011/0158398 A1* | 6/2011 | Kannan | H04M 3/5191 379/265.09 |
| 2012/0224681 A1* | 9/2012 | Desai | H04M 3/5166 379/266.1 |
| 2014/0140495 A1* | 5/2014 | Ristock | H04M 3/5232 379/265.05 |
| 2014/0226810 A1* | 8/2014 | Steiner | H04M 3/5233 379/265.12 |
| 2014/0270133 A1* | 9/2014 | Conway | H04M 3/5233 379/265.1 |
| 2014/0270138 A1* | 9/2014 | Uba | H04M 3/5233 379/265.06 |
| 2017/0054851 A1* | 2/2017 | Dervan | H04M 3/5238 |
| 2017/0118341 A1* | 4/2017 | Kelly | H04M 3/5233 |
| 2017/0208177 A1* | 7/2017 | Conway | H04M 3/523 |
| 2018/0063325 A1* | 3/2018 | Wilcox | G09B 21/001 |
| 2018/0121766 A1* | 5/2018 | McCord | G06K 9/6297 |
| 2018/0300787 A1* | 10/2018 | Patterson | G06Q 30/0625 |
| 2019/0306252 A1* | 10/2019 | Lebedev | H04L 12/1827 |
| 2020/0081939 A1* | 3/2020 | Subramaniam | G06N 5/022 |

* cited by examiner

ENHANCING AGENT'S EFFICIENCY IN A CONTACT CENTER BY USING A MULTI-AGENT TO MULTI-CONTACT ROUTING ORCHESTRATION

TECHNICAL FIELD

The present disclosure relates to the field of call center or contact center, Automatic Call Distribution (ACD) and contact routing.

BACKGROUND

In a contact center environment, typical interactions of an agent with a contact are commonly one contact during the entire interaction while multiple contacts may be assigned to one agent. However, an interaction such as a call interaction may be comprised of multiple portions in which each portion requires a different level of agent's proficiency. Consequentially, an agent incurring high costs for having specific skills may attend certain portions of the call to enquires which do not require these specific skills. Therefore, the portions which do not require special skills, could have been either automated by using an Artificial Intelligent (AI) bot with minimum cost or alternatively, completed by other agents which do not possess the specific skills and hence incur lower cost to the organization who operates the contact center.

Commonly, organizations strive to reduce their expenses on customer service i.e., contact center operations. One way to do so is to cut agents' costs by enhancing the agents' productivity in the contact center. For that purpose, the industry of call centers has implemented an enhanced routing paradigm such that an agent may be assigned multiple contacts, i.e., Multi-Contact routing. That is, an agent may be assigned multiple contacts and thus participate in multiple interactions via various communication channels, for example, an agent may handle several chats and a voice call.

However, currently implemented multi-contact routing paradigm, which is routing multiple inbound voice contacts per one agent lacks an additional improvement which could cut agent's costs even further. The implications of currently implemented paradigm are that an agent with specific skills is handling the entire interaction with a contact once it has been routed, even when some tasks i.e., portions of the interaction, could be serviced by less expensive sources such as AI bots or agents which do not possess the specific skills of the agent. Moreover, in some systems, an inbound interaction is attribute-based and routed to the most qualified agent, which is the agent having proficiencies required to accommodate the contact's requirements. Consequently, in many cases a highly skilled and a costly agent is performing elementary tasks during an interaction, which is a detriment to most measures of contact center efficiency.

Hence, to benefit from efficiency advantages of routing multiple agents having a range of proficiencies to one interaction with a contact and to increase an agent's productivity and productive time, there is a need to limit the scope of interactions with customers according to the agent's core proficiencies.

Furthermore, there is a need in an orchestration method implemented by an orchestration engine that will seamlessly incorporate bot technologies into a contact center without being limited by the sophistication of the bot AI and will increase an agent's productive time by limiting the scope of the agent's interactions with contacts according to the agent's core proficiencies and having other portions of the interaction handled by lower cost resources such as bots, agent or lower paid agents possessing lower-level skills.

SUMMARY

There is thus provided, in accordance with some embodiments of the present disclosure, a computerized method for enhancing agent's efficiency in a contact center by orchestrating a multi-agent to multi-contact attribute-based routing while maintaining a seamless contact interaction.

In accordance with some embodiments, the method may provide an agent's queue component, wherein the queue is comprised of associated one or more human agents or one or more Artificial Intelligence (AI) bot agents or a combination thereof.

In accordance with some embodiments, the method may provide a plurality of servers to manage a display of visual context for the human agents.

In accordance with some embodiments, the method may provide a set of communication channel rules to allocate one or more inbound communication channels to the one or more agents.

In accordance with some embodiments, the method may receive a request for service from a contact via a communication channel over a communication network.

In accordance with some embodiments, in a processor of a computerized system operating an orchestration engine. The orchestration engine may be configured to execute a code with instructions for deriving contact related information from the communication channel that the contact is coming from to yield at least one contact attribute.

In accordance with some embodiments, the executed code may further include the instructions for updating the agent's availability state, contact routable state and agent to contact association according to a preconfigured set of rules and the agent's availability state, and performing attribute-based routing of the request for service to one or more agents.

In accordance with some embodiments, the executed code may further include the instructions for designating a primary agent out of the one or more agents to handle the request for service.

In accordance with some embodiments, when more than two agents were routed the request for service, designating one or more agents as secondary agents out of the one or more agents which were not assigned as a primary agent.

In accordance with some embodiments, the set of rules is based on at least one proficiency of the one or more agents.

In accordance with some embodiments, once an interaction between the one or more agents and the contact has commenced via a communication channel, the executed code may further include the instructions for sending information related to the handled request to said one or more designated secondary agents' and enabling the one or more designated secondary agents to participate in the interaction via the display.

In accordance with some embodiments, the secondary agents may participate either passively or actively in the interaction.

according to a preconfigured set of rules and the agent's availability state, performing attribute-based routing as illustrated in detail in FIG. 2 of the request for service to one or more agents, and updating the agent's availability state, contact routable state and agent to contact association. The set of rules may be based on at least one proficiency of the one or more agents.

In accordance with some embodiments, the orchestration engine may passively conference in human agents to bot interactions i.e., conversations. For example, an agent assisted answering machine detection in a dialer, where one or more human agents are connected to the audio channel, or a real-time speech to text transcription of the audio, to assist the bot making the detection of live parties. In yet another example, an agent assisted IVR, where a contact may progress through a self-service IVR and may be enhanced with attributes that may conference in an agent, either actively or passively. The agent may arrange the bot with appropriate actions to take or additional prompts to play, or modifying the flow of the IVR to customize the customer experience.

In accordance with some embodiments, the preconfigured set of rules to perform attribute-based routing of the request for service to one or more agents may comprise the following operations: (i) retrieving from the agent's queue component all routable agents according to preconfigured agent's availability state; (ii) scoring each agent in the retrieved routable agents, according to compatibility of at least one proficiency of each agent and the contact attributes; (ii) calculating maximum number of assigned agents for the request of service of the contact; (iii) selecting a number of agents having a score above a predefined threshold from the retrieved routable agents. The selected number of agents is equal or lower than the calculated maximum number; and (iv) assigning the selected agents to the request of service of the contact.

In accordance with some embodiments, after scoring each agent in the retrieved routable agents, the retrieved agents may be sorted in an ascending or descending order and selecting the last or first agents respectively, according to the calculated maximum number.

In accordance with some embodiments, after scoring each agent in the retrieved routable agents and none of the agents have a score above a predefined threshold or below the predefined threshold, in other words, none of the agents have been selected, the contact may be updated with a permanent attribute-based association with the first retrieved agent regardless of the agent's score.

In accordance with some embodiments, the communication channel is a voice channel, or a digital channel and the communication channel of the commenced interaction is independent of the communication channel that the request for service from a contact has been received.

In accordance with some embodiments, the digital channel is at least one of: email, chat, messaging applications, live video, text messaging, and wherein the derived contact information is related to medium of the communication channel. The basic information for an inbound contact may be the to and from addresses provided to the system. For a phone contact this would be the Automatic Number Identification (ANI) e.g., the originating phone number or user name of the calling Session Initiation Protocol (SIP) phone and Dialed Number Identification Service (DNIS) e.g., the number that the user dialed. The address of the initiating party may be the email, phone number, chat URL, Facebook® page, etc. Text messaging may be implemented as a chat, an email or messaging applications such as WhatsApp, Facebook®, Twitter and Viber.

In accordance with some embodiments, the deriving contact related information is further operated to add contact attributes by retrieving information stored in an external data storage that is associated with the system based on the information from the communication channel.

In accordance with some embodiments, the external data storage may be a Customer Relationship Management (CRM) system.

In accordance with some embodiments, machine learning techniques may be implemented to use interactions of human agents to teach the AI bots a request for service handling techniques.

In accordance with some embodiments, the contact related information is further derived from contact's selection of an associated Interactive Voice Response (IVR) system to include service type to the at least one contact attribute.

In accordance with some embodiments, the one or more agents are associated with one or more proficiencies based on training or performance.

In accordance with some embodiments, upon detecting of a primary agent disconnection, assigning one of the assigned secondary agents as the primary.

In accordance with some embodiments, in the case of a loss of the primary agent, as detected by the system, triggering an update to agent state and the orchestration engine may assign one of the secondary agents with the primary agent's responsibilities.

In accordance with some embodiments, the commenced interaction is implemented as a single voice of the one or more agents which are participating in the interaction. A transition between agents during an interaction may appear seamless to the customer if there is a single voice fronting the agent communication. It may be accomplished either if the medium of communication is text or if digital conversion of agent voices is being implemented to sound the same regardless of the speaker.

There is further provided in accordance with some embodiments of the present disclosure, a computerized system for enhancing agent's efficiency in a contact center by orchestrating a multi-agent to multi-contact attribute-based routing while maintaining seamless contact interaction.

In accordance with some embodiments, the computerized system may include: a plurality of databases; an agent's queue component stored on the plurality of databases, wherein the queue is comprised of associated one or more human agents or one or more Artificial Intelligence (AI) bot agents or a combination thereof; a plurality of servers to manage a display of visual context for the human agents; a set of communication channel rules to allocate one or more inbound communication channels to the one or more agent; a memory to store the plurality of databases; and a processor.

In accordance with some embodiments, the communication channel is a voice channel, or a digital channel and the communication channel of the commenced interaction is independent of the communication channel that the request for service from a contact has been received.

In accordance with some embodiments, the processor may be configured to receive a request for service from a contact via an allocated communication channel over a communication network and operate an orchestration engine.

In accordance with some embodiments, the orchestration engine may be configured to execute a code with instructions to: derive contact related information from the communication channel that the contact is coming from to yield at least one contact attribute; and according to a preconfigured set of rules and the agent's availability state, perform attribute-based routing of the request for service to one or more agents, and update the agent's availability state, contact routable state and agent to contact association.

In accordance with some embodiments, the set of rules may be based on at least one proficiency of the one or more agents.

In accordance with some embodiments, the code may have further instructions to designate a primary agent out of the one or more agents to handle the request for service.

In accordance with some embodiments, when more than two agents were routed the request for service, the code may have further instructions to designate one or more agents as secondary agents out of the one or more agents which were not assigned as a primary agent.

In accordance with some embodiments, once an interaction between the one or more agents and the contact has commence, the code may have further instructions to send information related to the handled request to said one or more designated secondary agents' and to enable the one or more designated secondary agents to participate in the interaction via the display.

In accordance with some embodiments, the plurality of servers further provides web interfaces to accept human agent's input to the orchestration engine.

In accordance with some embodiments, the web interfaces further enable the human agent to set availability states which affects the attribute-based routing.

In accordance with some embodiments, the channel is a voice channel or a digital channel.

In accordance with some embodiments, the digital channel is at least one of: email, chat, messaging applications, live video, text messaging, and wherein the derived contact information is related to medium of the communication channel.

In accordance with some embodiments, the derived contact related information is further operated to add contact attributes by having the processor further configured to retrieve information stored in an external data storage that is associated with the system based on the information from the communication channel.

In accordance with some embodiments, machine learning techniques may be implemented to use interactions of human agents to teach the AI bots a request for service handling techniques.

In accordance with some embodiments, the contact related information is further derived from contact's selection of an associated Interactive Voice Response (IVR) system to include service type to the at least one contact attribute.

In accordance with some embodiments, the one or more agents are associated with one or more proficiencies based on training or performance.

In accordance with some embodiments, the commenced interaction is implemented as a single voice of the one or more agents which are participating in the interaction.

In accordance with some embodiments, the contact routable state and contact related information are operated by a contact entity services, wherein the agent's availability state is maintained by an agent entity services, and wherein the agent to contact association is maintained by an agent to contact entity services.

BRIEF DESCRIPTION OF THE DRAWINGS

For the present disclosure to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

Figure 1:
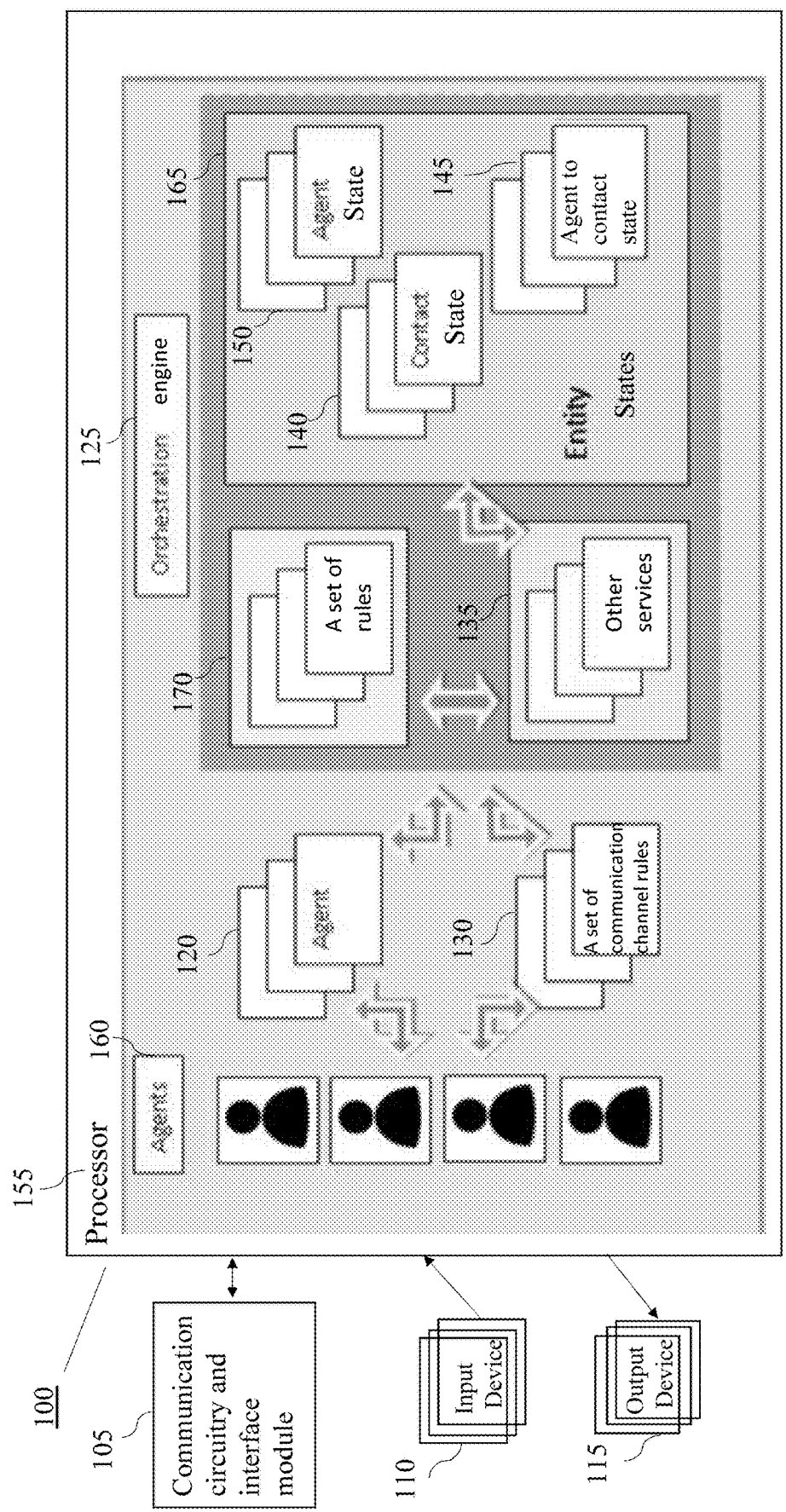
FIG. 1 is a system architecture 100 for enhancing agent's efficiency in a contact center by orchestrating a multi-agent to multi-contact attribute-based routing while maintaining seamless contact interaction.

In the following detailed description, numerous specific details are set forth in order to provide a thorough understanding of the disclosure. However, it will be understood by those of ordinary skill in the art, that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The term "seamless contact interaction" as used herein refers to a smooth transition between multiple agents which are assigned and participating in the same call interaction or any other form of interaction, providing the contact a single agent experience. Moreover, during the smooth transition each participating agent is fully briefed in the content of the ongoing interaction and hence may participate in any portion of it with no need to ask the contact any question that has already been previously responded by the contact. Seamless contact interaction may be implemented by the following techniques: sentiment analysis, textual conversation summarization, keyword highlighting, and visual conversation flow indicating progression through a predefined action sequence.

The term "agent's availability state" as used herein relates to an indication whether an agent can be routed contacts.

The term "routing" as used herein is a refinement of the types of contacts an agent may be routed and number of each type that can be handled concurrently as well as multiple contacts per agent.

The embodiments taught herein increase an agent's productive time by solving the technical problem of handling multiple voice interactions in parallel with multi-agent per contact. A multi-agent to multi-contact attribute-based routing may be implemented by an orchestration method. The orchestration method may increase the agent's productive time by considering the diverse skills set and level of each skill of each agent and thus would enhance the productivity of each agent and would expedite the completion of all tasks i.e. portions of multiple-interactions, concurrently in a cost-effective manner.

Redundancy as an engineering term means the inclusion of extra components which are not strictly necessary to functioning, in case of failure in other components. The embodiments taught herein cure a situation in which an interaction between a client and an agent in the contact center fails due to reasons which are related to the agent by implementing an orchestration method which assigns multiple agents to a contact.

According to some embodiments, an implementation of redundant agent routing by the orchestration method may handle for example, a situation where a client has to recontact the contact center because the designated agent doesn't respond to the contact interaction or drops the interaction. In such case, the orchestration method may have one of the multiple agents, which are assigned to the interaction, actively participate in the interaction.

According to some embodiments, the implementation of redundant agent routing by the orchestration method, in another non-limiting example, may handle a situation, where an outbound dialer simultaneously routes an outbound call to two agents. One agent may be designated as a primary agent and the other one as a secondary agent. Both designated primary and secondary agents may have rights to speak to the called party. When the client picks up the phone and starts speaking and the primary agent doesn't say anything due to broken headset, or on mute status or any other reason, because a redundant agent, i.e., the secondary agent was also routed to the call, that agent may recognize the absence of the primary agent, or may be informed by the system and respond to the client. Thus, the interaction with the called party continues with the secondary agent who has assumed primary responsibilities and the efficiency of the contact center increases.

When the orchestration method and redundant agent routing are not implemented, when an agent that is routed to an interaction does not respond, the interaction ends and the interaction has to be reestablished.

According to some embodiments, orchestrating the allocation of work may be based on worker proficiencies and employing the least costly resource, in parallel when applicable, for each task, or automating workers when it is applicable.

According to some embodiments, the handling of multiple voice interactions in parallel with multi-agent per contact may be implemented by assigning low cost resources or automated bots, which incur minimum cost, to cover mundane activities of contact interactions such as: greetings, information gathering, or the reading of compliance statements while assigning higher cost resources, i.e., advanced skilled agents, to unconventional activities. Furthermore, the advanced skilled agents may work in parallel, across those interactions.

According to some embodiments, the handling of multiple voice interactions in parallel with multi-agent per contact may also be implemented by unifying channels of communication where possible to a chat-like interface, where text-to-voice allows parallel communication on multiple voice channels.

According to some embodiments, a visual cue such as an indication in a user-interface if an agent has primary interaction responsibility or for a phone contact, a list of several agent assignments to an interaction, provided by the contact card, may be displayed. Furthermore, the assigned responsibility would be visually indicated.

According to some embodiments, through the visual cues, the orchestration engine may designate a primary agent. The primary designation of an agent may highlight some portion of this card to indicate that the primary agent should be engaged in the oral conversation. During the interaction, designated secondary agents would receive whole or summary information on the progress of the interaction. Secondary agent assignments may provide permissions to speak with the contact, and/or communicate with the primary agent e.g., via chat. According to some embodiments, the designated secondary agents may participate either passively or actively in the interaction. In the case of a loss of the primary agent, as detected by the orchestration engine, an update to agent state may be triggered, and the orchestration engine may assign one of the designated secondary agents with the primary agent's responsibilities. In an interaction such as a call interaction this transition may appear seamless to the contact if there is a single voice fronting the agent communication.

According to some embodiments, a single voice communication may be implemented when the medium of communication is text-based or when the digital conversion of the agent voices is transformed to sound the same no matter the speaker. A more mundanely implementation may be by having the first agent which responds to the call interaction orient the contact, thereby setting the expectation that multiple agents are participating. For example, the first agent may begin the call interaction by saying "i.e. How can we help you today?". However, this implementation is not always practical when considering compliancy scenarios such as Health Insurance Portability and Accountability Act (HIPAA).

According to some embodiments, key metrics like Average Wait Time, First Contact Resolution, and Cost per Contact may be compared positively against other systems to demonstrate reductions in operational costs that were inflated due to the limitations of traditional routing paradigms.

FIG. 1 is a system architecture 100 for enhancing agent's efficiency in a contact center by orchestrating a multi-agent to multi-contact attribute-based routing while maintaining a seamless contact interaction.

According to some embodiments, the system architecture 100 may include an agents' queue component 160 which may be stored on a plurality of databases (not shown). The agent's queue 160 may be comprised of associated one or more human agents or one or more Artificial Intelligence (AI) bot agents or a combination thereof.

According to some embodiments, the system architecture 100 may also include a memory (not shown) which stores the plurality of databases and a plurality of servers to manage input device such as one or more input devices such as input devices 110 and a plurality of servers to manage a display of visual context for the human agents such as one or more output devices 115.

According to some embodiments, reporting of agent's performance history and efficiency measurement may match an updated ontology that reflects the new multi-agent to multi-contact context. For that purpose, tracking the concurrent interactions would be needed in the reporting and the agent's responsibility in each interaction i.e., primary agent or secondary agent.

According to some embodiments, to provide context between agents, summarization display of sentiment, and other conversational visual cues may be built into the orchestration engine, thus, eliminating the conversational transition constraints inherent in legacy systems. Furthermore, the visual cues may visualize conversation history, customer sentiment, and previous agent interactions.

According to some embodiments, the system architecture 100 may also include a set of communication channel rules 130 to allocate one or more inbound communication channel to the one or more agent in the agents' queue component 160.

According to some embodiments, by the multi-agent to multi-contact attribute-based routing multiple agents may be assigned per contact and multiple contacts per agent. With multiple active agent participants, customer needs may be addressed in parallel which would positively affect efficiency metrics related to time-to-customer-resolution.

According to some embodiments, a single agent from the agents' queue component 160 may communicate by using voice recordings or text-to-speech in parallel. For example, an outbound system may be designed with a mechanical interface that may allow an agent to listen through multiple headset speakers to simultaneous calls that were dialed and play pre-recorded responses using an enhanced keyboard like a mad organist.

According to some embodiments, human agents may influence the interaction when needed and teach the AI bots a request for service handling techniques.

According to some embodiments, the system architecture 100 may also include a processor 155 which may be configured to receive a request for service from a contact such as the contact denoted as 140 via an allocated communication channel over a communication network, such as communication circuitry and interface module 105.

According to some embodiments, agents may be assigned and responsible for sections i.e., portions of an interaction, based on their proficiencies instead of being assigned and responsible for the entire interaction. Top level resources may be used only when mostly needed during the interactions and will be conferenced in at the right moment to be most effective. The right moment may be when a contact has an enquiry that is not in the regular contact's protocol or for example, when an agent responsible for sales is conferenced in after initial information gathering or product introduction portions of the interaction. According to another example, contact interactions on an outbound dialer campaign, when a bot or less proficient agents can handle answering machine detection and initial introductions as more proficient agents are later conferenced into known live contact interactions.

Agents in a contact center are commonly trained to handle various scenarios which arise during an interaction with a customer. According to some embodiments, single-use scenarios which may be for example, having an agent responding general parts of the interaction which does not require any specific proficiency in customer service like sales or tech support, may be implemented. Consequently, different agent resources may be conferenced in to handle specific sections of the interaction. Furthermore, agents may be trained down to the level of performing a specific task instead being cross trained to handle a large number of scenarios that may arise during an interaction. conversation summarization, checklists, role identification, and sentiment display would provide context as agent resources are assigned and requested to actively participate in one or more interaction by the orchestration system.

According to some embodiments, the processor 155 may be also configured to operate an orchestration engine such as orchestration engine 125. The orchestration engine 125 may be configured to execute a code with instructions for deriving contact related information from the communication channel that the contact is coming from to yield at least one contact attribute. The contact related information will be further described in detail in FIG. 2.

According to some embodiments, the executed code of the orchestration engine 125 may also have instructions to perform attribute-based routing of the request for service to one or more agents 160 according to a preconfigured set of rules 170 and the agent's availability state and updating the entity state such as in entity states 165. The Entity states 165 may be the state models that reflect the current state of the given entity and the rules that govern transitions between states of the given entity. The current state of the given entity may be agent's availability state 150, contact routable state 140 and agent to contact association 145. According to some embodiments, the attribute-based routing may be operated to select the best assignments of multiple agents to a contact, according to the contextual information of contacts and agents.

According to some embodiments, other services 135 may be coordination services, which may operate the coordination of the communications between the orchestration engine 125 and peripheral services. The coordination services may include managing concurrent operations, ensuring messages are not lost, validating appropriateness of communication, collecting routing contextual information from the state services, ensuring delivery of routing decisions to the media services and agent websites, and coordinating state transitions that affect multiple entities. The coordination services may further update contact attributes according to business rules and may trigger routing with the updated information.

According to some embodiments, the set of rules 170 may be based on at least one proficiency of the one or more agents. Moreover, the preconfigured set of rules to perform attribute-based routing of the request for service to one or more agents 170, may comprise the following operations: retrieving from the agent's queue component all routable agents according to preconfigured agent's availability state and scoring each agent in the retrieved routable agents, according to compatibility of at least one proficiency of each agent and the contact attributes.

According to some embodiments, a maximum number of assigned agents for the request of service of the contact may be calculated and a number of agents having a score above a predefined threshold from the retrieved routable agents, may be selected. The selected number of agents which may be assigned may be equal or lower than the calculated maximum number. According to some embodiments, the executed code of the orchestration engine 125 may also have instructions for designating a primary agent out of the one or more agents to handle the request for service, such as agents 120. When more than two agents were routed the request for service, the executed code of the orchestration engine 125 may designate one or more agents as secondary agents out of the one or more agents which were not assigned as a primary agent. Once an interaction between the one or more agents 120 and the contact has commenced, the executed code of the orchestration engine 125 may send information related to the handled request to said one or more designated secondary agents' and enable the one or more designated secondary agents to participate in the interaction via the output device 115 e.g., display.

According to some embodiments, in the case of a loss of the primary agent, as detected by the system, triggering an update to agent state and the orchestration engine may assign one of the secondary agents with the primary agent's responsibilities. The communication channel may be a voice channel, or a digital channel and the communication channel of a commenced interaction may be independent of the communication channel that the request for service from a contact has been received.

For example, when the communication channel is a phone call, the loss of the primary agent may occur when that agent loses the phone connection. The loss of the phone connection may trigger the orchestration 125 to find a new primary agent for the contact, as the system does not know if connection can be reestablished with the previous agent.

In another example, when the communication channel is a digital channel, the loss of the primary agent may occur when the internet connection is determined to be down according to a measured delay in response beyond a predefined threshold. In yet another example, when the communication channel is longer lived like email and SMS the loss of the primary agent may occur in an agent termination, or sickness and the like.

According to some embodiments, the digital channel is at least one of: email, chat, messaging applications, live video, text messaging.

According to some embodiments, derived contact information may be related to medium of the communication channel and a deriving contact related information may be operated to add contact attributes by retrieving information stored in an external data storage that may be associated with the system based on the information from the communication channel.

According to some embodiments, the contact related information may be derived from contact's selection of an associated Interactive Voice Response (IVR) system to include service type to the at least one contact attribute.

According to some embodiments machine learning techniques may be implemented to use interactions of human agents to teach the AI bots a request for service handling techniques.

Figure 2:
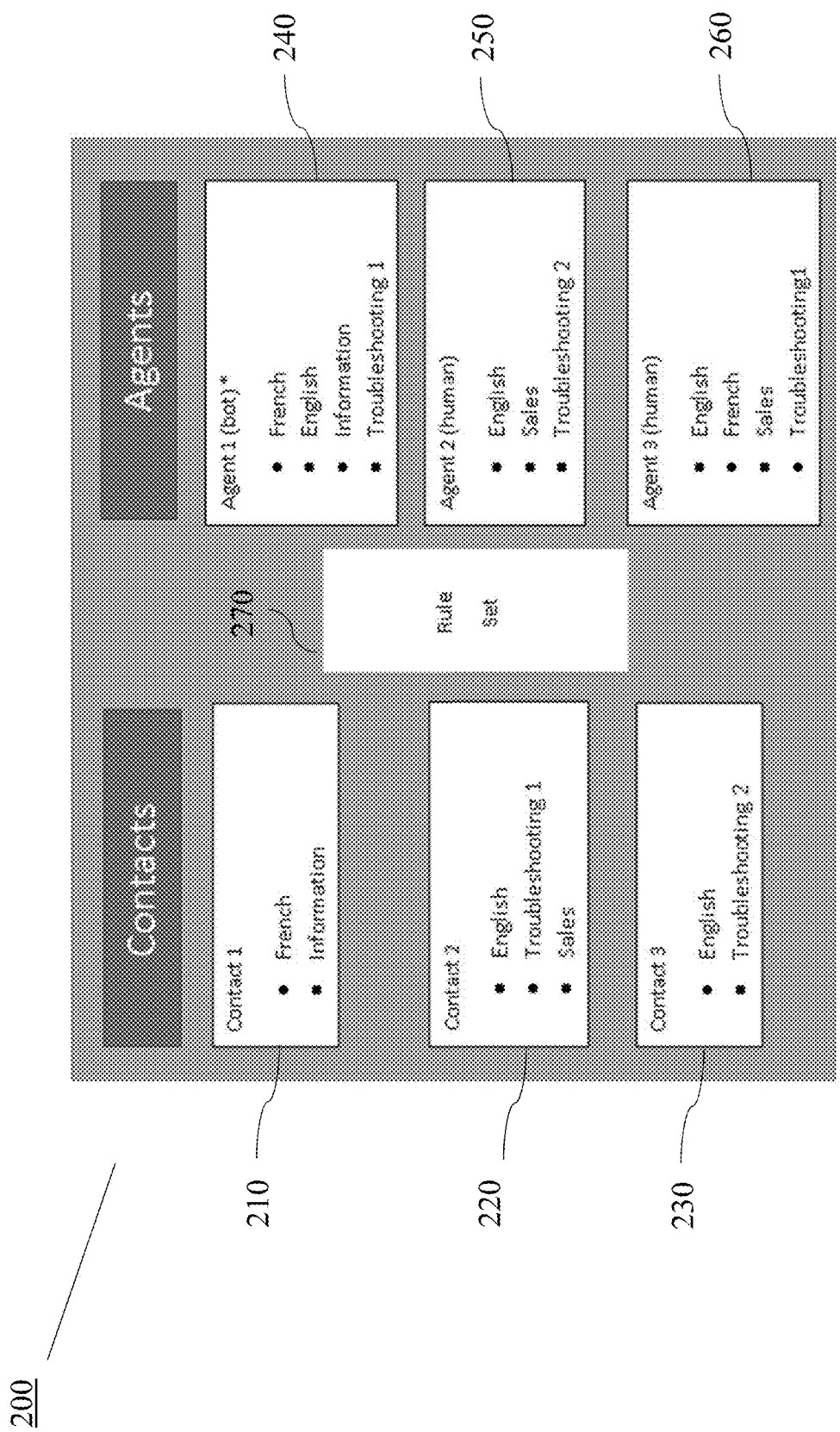
FIG. 2 is a diagram of a component for attribute-based routing 200, according to some embodiments of the present disclosure.

FIG. 2 is a diagram of a component for attribute-based routing 200, according to some embodiments of the present disclosure.

An Attribute Based routing strategy matches agents and contacts granularly, given a more holistic consideration of the matching context. The strategy is to find the best matches considering attributes that may change priorities or drop completely as time or other system variables change.

Agents are assigned attribute related proficiencies (usually with value gradations) based on training or performance as shown in the diagram of a component for attribute-based routing 200. Some of these agent proficiencies are used in ordering multiple matching agents against one another using configurable scoring algorithms. Most proficiencies are criteria that must match contact attributes for a match to be made.

According to some embodiments one or more agents may be associated with one or more proficiencies based on training or performance.

As shown in FIG. 2, a contact is assigned attributes based on data gathered through the medium of the communication channel. The basic information for an inbound contact may be the to and from addresses provided to the system. Contact attributes may be required or may be used strictly as ordering criteria in best match algorithms. A rule set 270 may be used as a template to validate that a full set of required contact attributes are assigned. It may also be used to define a set of default attribute values.

A non-limiting example is provided in FIG. 2 where 'Contact 1' 210 only has a single match of 'Agent 1' 240. Furthermore, 'Agent 1' 240 is not a human agent but a bot agent which meets the routing criteria, having the requisite proficiencies for 'Contact 1' 210 attributes i.e., needs of French language and Information requested.

In the non-limiting example of FIG. 2 'Contact 2' 220 has two agent matches: 'Agent 2' 250 and 'Agent 3' 260. Orchestration engine 125 would have to decide, given the entire context or parameters, which of the two agents: 'Agent 2' 250 and 'Agent 3' 260 are the best match for 'Contact 2' 220. The entire context or parameters may be the fact that 'Agent 2' 250 is the only match for 'Contact 3' 230, meaning to make sure that all contacts requests for service are accommodated. Another decision could also be made that 'Agent 2' 250 is the best match for 'Contact 2' 220 on some other scoring basis, favoring some affinity over Service-Level Agreement (SLA).

According to some embodiments, a request for service may be received from a contact such as 'contact 1' 210, 'contact 2' 220 or 'contact 3' 230. The request for service may be received via a communication channel such as a voice channel or a digital channel, over a communication network. The digital channel may be email, chat, messaging applications, live video, text messaging, and the derived contact information may be related to the medium of the communication channel.

According to some embodiments, the contact related information may be derived from the communication channel that the contact is coming from to yield at least one contact attribute. In a non-limiting example, one of the attributes of 'contact 1' 210 that may be derived from the communication channel and may be the communication language of 'contact 1' 210 which is French. Another attribute of 'contact 1' 210 may be a request to receive information. The nature of the request may be derived from the communication channel or via an associated Interactive Voice Response (IVR) system (not shown). In another non-limiting example, one of the attributes of 'contact 2' 220 may be derived from the communication channel and may be the communication language of 'contact 2' 120 which is English. Another attribute of 'contact 2' 220 may be a request for troubleshooting of a certain subject denoted as 'troubleshooting 1' e.g., troubleshooting level 1 and a request for service from the sales department. The nature of the request may be derived from the communication channel or via an associated Interactive Voice Response (IVR) system (not shown). In yet another non-limiting example, 'contact 3' 230 may have English as communication language and 'troubleshoot 2' e.g., troubleshooting level 2 as the request for service.

In yet another non-limiting example, in a contact center of a computer service company, 'troubleshooting 1' may include mundane tasks such as making sure the computer is plugged in, helping with a simple upgrade, etc. 'Troubleshooting 2' may be a proficiency extension where the agent has further training to handle more complex troubleshooting scenarios. An agent with a level 2 proficiency can handle level 1 problem solving but may receive higher scoring outcomes for contacts that require level 2 support.

According to some embodiments, a set of rules 270 which is also denoted as 170 in FIG. 1, may be provided to perform attribute-based routing of the request for service to one or more agents according to the agents' availability state. The preconfigured set of rules 270 may be based on at least one proficiency of the one or more agents. In a non-limiting example, the proficiencies of 'agent 1' 240 may be French and English as communication languages and type of provided service may be information and troubleshooting level 1 denoted as 'troubleshooting 1'. In another example, the proficiencies of 'agent 2' 250 may be English as communication language and the types of provided services may be sales and troubleshooting level 2 denoted as 'troubleshooting 2'. In yet another example, the proficiencies of 'agent 3' 260 may be English and French as communication languages and the types of provided services may be sales and troubleshooting level 1 denoted as 'troubleshooting 1'.

Figure 3A:
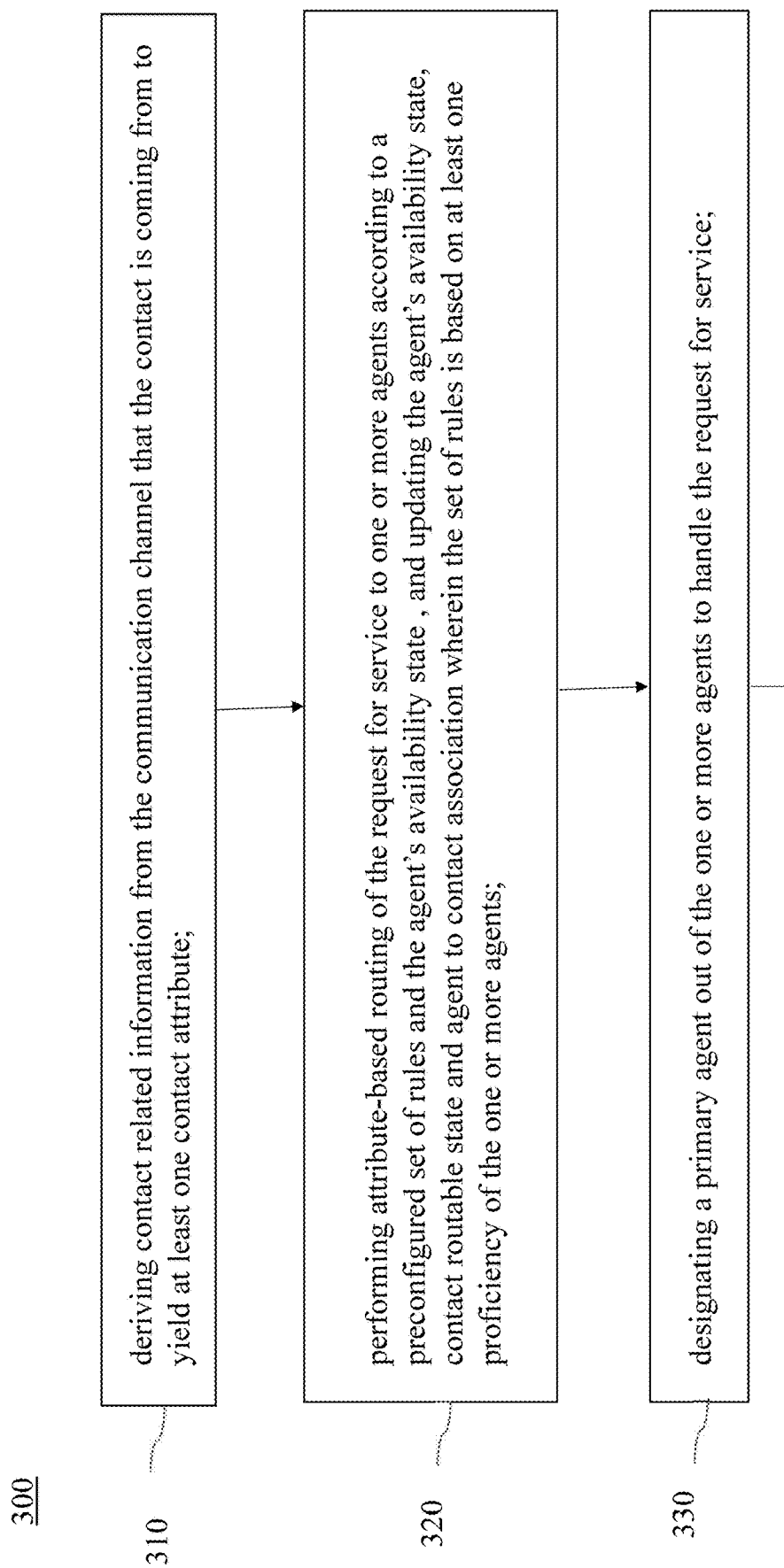
FIGS. 3A-3B illustrate a flow of operations performed by an orchestration engine 300, according to some embodiments of the disclosure.
Figure 3B:
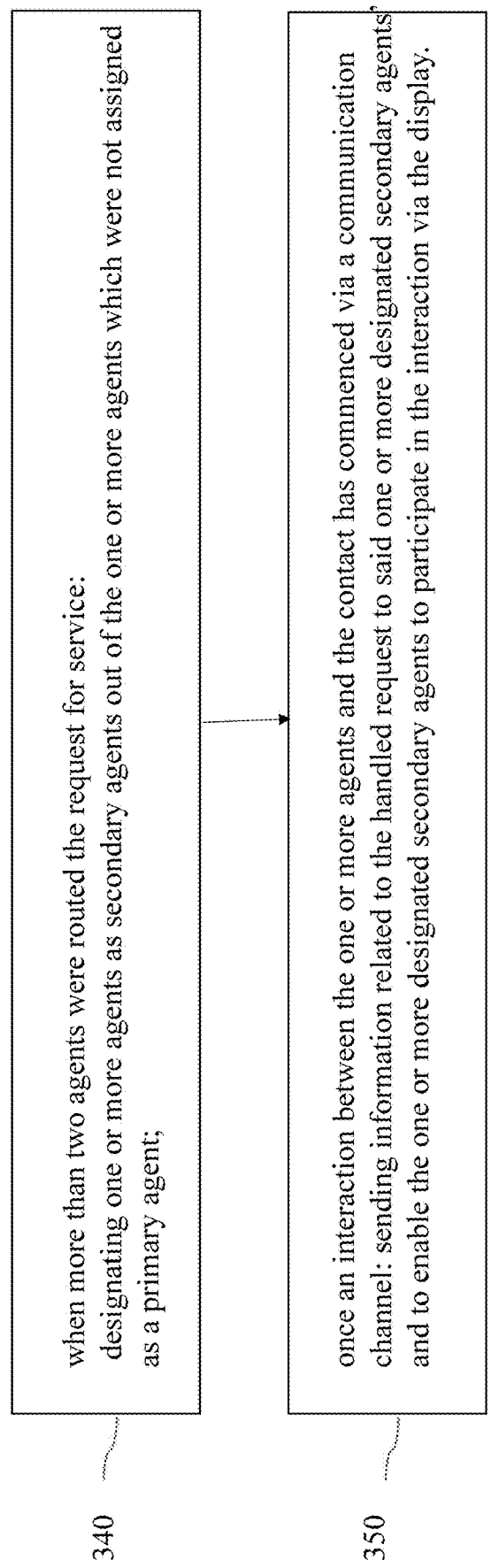

FIGS. 3A-3B illustrate a flow of operations performed by an orchestration engine 300, according to some embodiments of the disclosure.

According to some embodiments, the orchestration engine 300 may be implemented via a processor, a memory, an output device, an input device and communication circuitry and interface module for wired and/or wireless communication with any other computerized device over a communication network (all not shown).

According to some embodiments, the orchestration engine 300 may use the processor and memory to route an inbound interaction such as a call interaction or any other type of interaction to multiple agents.

According to some embodiments, operation 310 may comprise deriving contact related information from the communication channel that the contact is coming from, to yield at least one contact attribute.

According to some embodiments, operation 320 may comprise, performing attribute-based routing of the request for service to one or more agents, according to a preconfigured set of rules and the agent's availability state and updating the agent's availability state, contact routable state and agent to contact association wherein the set of rules is based on at least one proficiency of the one or more agents.

According to some embodiments, operation 330 may comprise designating a primary agent out of the one or more agents to handle the request for service.

According to some embodiments, operation 340 may comprise when more than two agents were routed the request for service: designating one or more agents as secondary agents out of the one or more agents which were not assigned as a primary agent.

According to some embodiments, operation 350 may comprise once an interaction between the one or more agents and the contact has commenced via a communication channel: sending information related to the handled request to said one or more designated secondary agents' and to enable the one or more designated secondary agents to participate in the interaction via the display.

Figure 4:
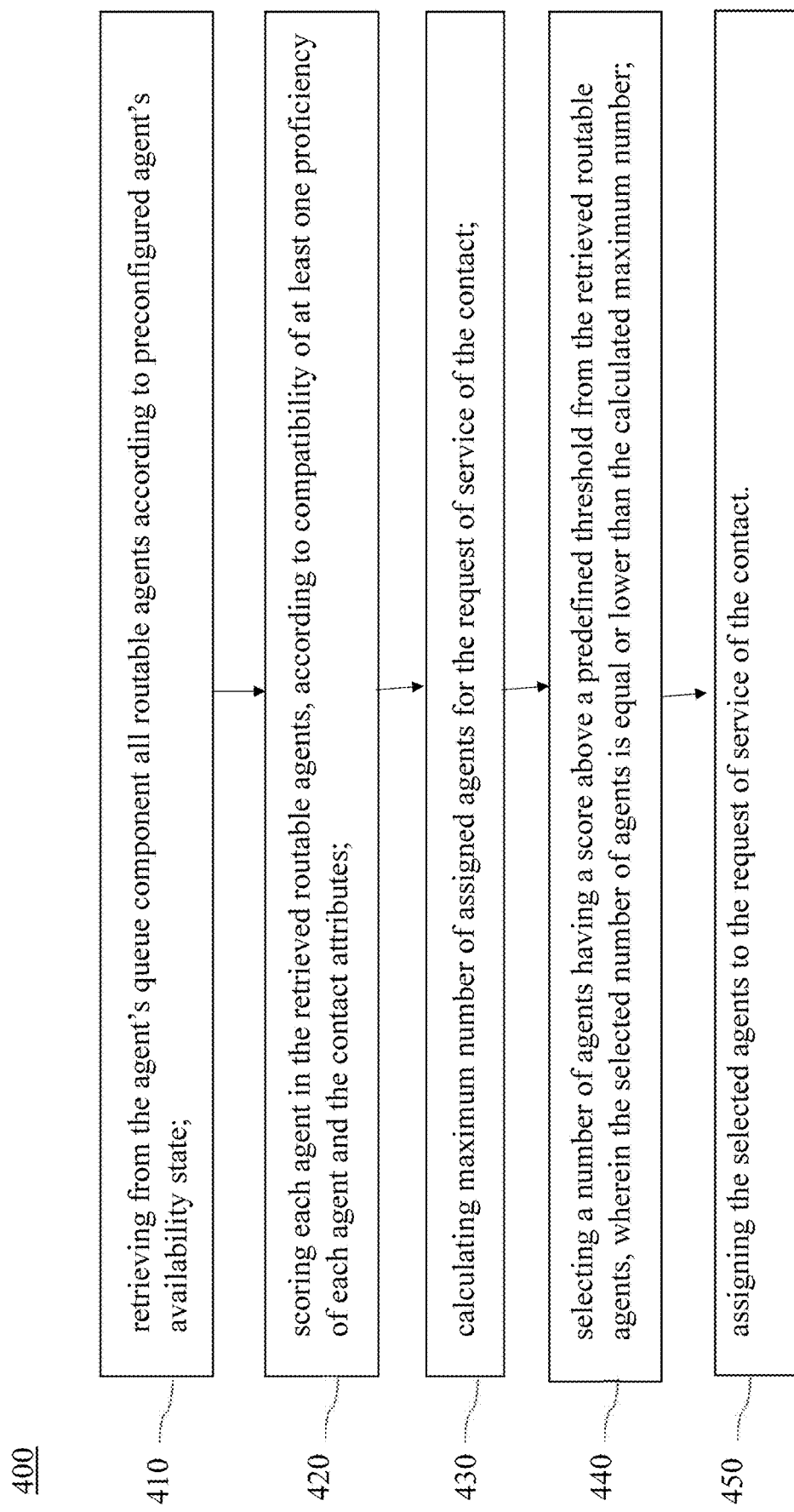
FIG. 4 illustrates a flow chart of set of rules 400, to perform attribute-based routing of the request for service to one or more agents, according to some embodiments of the disclosure.

FIG. 4 illustrates a flow chart of set of rules 400, to perform attribute-based routing of the request for service to one or more agents may comprise the following operations, according to some embodiments of the disclosure.

According to some embodiments, operation 410 may comprise retrieving from the agent's queue component all routable agents according to preconfigured agent's availability state.

According to some embodiments, operation 420 may comprise scoring each agent in the retrieved routable agents, according to compatibility of at least one proficiency of each agent and the contact attributes.

According to some embodiments, operation 430 may comprise calculating maximum number of assigned agents for the request of service of the contact.

According to some embodiments, operation 440 may comprise selecting a number of agents having a score above a predefined threshold from the retrieved routable agents, wherein the selected number of agents is equal or lower than the calculated maximum number.

According to some embodiments, operation 450 may comprise assigning the selected agents to the request of service of the contact.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A computerized method for enhancing agent's efficiency in a contact center by orchestrating a multi-agent to multi-contact attribute-based routing while maintaining a seamless contact interaction, the computerized method comprising:
- providing an agent's queue component, wherein the agent's queue component is comprised of associated one or more human agents and one or more Artificial Intelligence (AI) bot agents;
- providing a plurality of servers to manage a display of visual context for the human agents;
- providing a set of communication channel rules to allocate one or more inbound communication channels to one or more agents;
- receiving a request for service from a contact via a communication channel over a communication network;
- in a processor of a computerized system operating an orchestration engine, the orchestration engine is configured to execute a code with instructions for:
- retrieving from the agent's queue component, routable agents according to a preconfigured agent's availability state;
- performing attribute-based routing of the request for service, to select one or more agents from the retrieved mutable agents and to assign the selected one or more agents to the request of service, and updating, for each assigned agent, an availability state, a contact-routable state and an agent-to-contact association,
  - wherein the set of communication channel rules is based on at least one proficiency of the one or more agents;
- designating a primary, agent out of the one or more agents to handle the request for service,
- wherein when the orchestration engine can't find a human agent having a proficiency as defined in the computerized system, said orchestration engine is designating as a primary agent, a bot agent,
- when more than two agents were routed the request for service:
  - designating one or more agents as secondary agents out of the one or more agents which were not assigned as a primary agent;
- once an interaction between the one or more agents and the contact has commenced via a communication channel:
- sending, information related to the request to said one or more designated secondary agents and enabling the one or more designated secondary agents to participate in the interaction via input devices and the display.

2. The computerized method of claim 1, wherein the performing of attribute-based routing of the request for service, further comprising the following operations:
- deriving contact-related information from the communication channel that the contact is coming from, to yield at least one contact attribute;
- scoring each agent in the retrieved routable agents, according to compatibility of at least one proficiency of each agent and the at least one contact attribute;
- calculating a maximum number of assigned agents for the request of service of the contact; and
- selecting a number of agents having a score above a predefined threshold from the retrieved mutable agents, wherein the selected number of agents is equal or lower than the calculated maximum number.

3. The computerized method of claim 1, wherein the communication channel is a voice channel or a digital channel, and the communication channel of the commenced interaction is independent of the communication channel that the request for service from which a contact has been received.

4. The computerized method of claim 3, wherein the digital channel is at least one of: email, chat, messaging applications, live video, or text messaging, and wherein the derived contact information is related to a medium of the communication channel.

5. The computerized method of claim 1, wherein the deriving contact-related information is further operated to add contact attributes by retrieving information stored in an external data storage that is associated with the system, based on the information from the communication channel.

6. The computerized method of claim 1, wherein machine-learning techniques are implemented to use interactions of human agents to teach the AI bots request for service handling techniques.

7. The computerized method of claim 1, wherein the contact-related information is farther derived from contact's selection of an associated Interactive Voice Response (IVR) system to include service type to the at least one contact attribute.

8. The computerized method of claim 1, wherein the one or more agents are associated with one or more proficiencies based on training or performance.

9. The computerized method of claim 1, the method further comprising upon detecting of a primary agent disconnection, assigning one of the assigned secondary agents as the primary.

10. The computerized method of claim 1, wherein said commenced interaction is implemented as a single voice of the one or more agents which are participating in the interaction.

11. A computerized system for enhancing agent's efficiency in a contact center by orchestrating a multi-agent to multi-contact attribute-based routing while maintaining seamless contact interaction, the computerized system comprising:
- a plurality of databases;
- an agent's queue component stored on the plurality of databases, wherein the agent's queue component is comprised of associated one and more human agents or one or more Artificial Intelligence (AI) bot agents;
- a plurality of servers to manage a display of visual context for the human agents;
- a set of communication channel rules to allocate one or more inbound communication channels to one or more agents;
- a memory to store the plurality of databases;
- a processor, said processor is configured to:
- receive a request for service from a contact via an allocated communication channel over a communication network;
- operate an orchestration engine, the orchestration engine is configured to execute a code with instructions to:
- derive contact-related information from the communication channel that the contact is coming from to yield at least one contact attribute;
- retrieve from the agent's queue component, routable agents according to a preconfigured agent's availability state;
- perform attribute-based routing of the request for service to select one or more agents from the retrieved mutable agents and to assign the selected one or more agents to the request of service, and update an availability state for each assigned agent, a contact-routed e state and an agent-to-contact association, wherein the set of communication channel rules is based on at least one proficiency of the one or more agents;

designate a primary agent out of the one or more agents to handle the request for service, wherein when the orchestration engine can't find a human agent having a proficiency as defined in the computerized system, said orchestration engine is designating as a primary agent, a bot agent, when more than two agents were routed the request for service:

designate one or more agents as secondary agents out of the one or more agents which were not assigned as a primary agent;

once an interaction between the one or more agents and the contact has commenced:

send information related to the request to said one or more designated secondary agents and to enable the one or more designated secondary agents to participate in the interaction via input devices and the display.

12. The computerized system of claim 11, wherein the plurality of servers further provides web interfaces to accept human agent's input to the orchestration engine.

13. The computerized system of claim 11, wherein the web interfaces further enable the human agent to set availability states which affect the attribute-based routing.

14. The computerized system of claim 11, wherein the channel is a voice channel or a digital channel.

15. The computerized system of claim 11, wherein the digital channel is at least one of email, chat, messaging applications, live video, or text messaging, and wherein the derived contact information is related to a medium of the communication channel.

16. The computerized system of claim 11, wherein the derived contact-related information is further operated to add contact attributes by having the processor further configured to retrieve information stored in an external data storage that is associated with the system based on the information from the communication channel.

17. The computerized system of claim 11, wherein machine learning techniques are implemented to use interactions of human agents to teach the bots request for service handling techniques.

18. The computerized system of claim 11, wherein the contact-related information is further derived from contact's selection of an associated Interactive Voice Response (IVR) system to include service type to the at least one contact attribute.

19. The computerized system of claim 11, wherein the one or more agents are associated with one or more proficiencies based on training, or performance.

20. The computerized system of claim 11, wherein said commenced interaction is implemented as a single voice of the one or more agents which are participating in the interaction.

21. The computerized system of claim 11, wherein the contact routable state and contact related information are operated by a contact entity service, wherein the agent's availability state is maintained by an agent entity service, and wherein the agent-to-contact association is maintained by an agent-to-contact entity service.

22. The computerized method of claim 1, wherein when a primary agent cannot handle the request due to a technical malfunction, the designated secondary agent recognizes the absence of the primary agent or is informed by the system and handles the request, thus, the interaction with the contact continues with the secondary agent, which assumes primary responsibilities.

23. The computerized system of claim 11, wherein when a primary agent cannot handle the request due to a technical malfunction, the designated secondary agent recognizes the absence of the primary agent or is informed by the system and handles the request, thus, the interaction with the contact continues with the secondary agent, which assumes primary responsibilities.

24. The computerized method of claim 1, wherein the set of communication channel rules comprising assigning a bot agent to handle mundane activities of the request for service and a human agent to handle other activities of the request for service.

25. The computerized method of claim 24, wherein the computerized method further comprising assigning the human agent a plurality of requests for service in parallel.

26. The computerized system of claim 11, wherein the set of communication channel rules comprising assigning a bot agent to handle mundane activities of the request for service and a human agent to handle other activities of the request for service.

27. The computerized system of claim 26, wherein said processor is further configured to assign the human agent a plurality of requests for service in parallel.

* * * * *